US010412654B2

(12) United States Patent
Maric et al.

(10) Patent No.: US 10,412,654 B2
(45) Date of Patent: Sep. 10, 2019

(54) METHOD FOR IMPROVING DATA THROUGHPUT IN WIRELESS NETWORKS

(71) Applicant: Telefonaktiebolaget L M Ericsson (publ), Stockholm (SE)

(72) Inventors: Ivana Maric, Sunnyvale, CA (US); Dennis Hui, Sunnyvale, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 901 days.

(21) Appl. No.: 14/181,995

(22) Filed: Feb. 17, 2014

(65) Prior Publication Data
US 2015/0237563 A1 Aug. 20, 2015

(51) Int. Cl.
*H04W 40/04* (2009.01)
*H04W 40/12* (2009.01)
*H04W 40/22* (2009.01)

(52) U.S. Cl.
CPC ........... *H04W 40/04* (2013.01); *H04W 40/12* (2013.01); *H04W 40/22* (2013.01)

(58) Field of Classification Search
CPC ..... H04W 40/04; H04W 40/22; H04W 40/00; H04W 40/12; H04W 40/02; H04L 45/00
USPC ................ 370/315, 338, 252, 469, 230, 235
See application file for complete search history.

(56) References Cited

U.S. PATENT DOCUMENTS

| 7,079,552 B2* | 7/2006 | Cain | H04L 45/16 |
| | | | 370/329 |
| 2006/0234756 A1* | 10/2006 | Yamasaki | H04W 48/20 |
| | | | 455/525 |
| 2007/0160014 A1* | 7/2007 | Larsson | H04B 7/022 |
| | | | 370/338 |
| 2010/0157826 A1* | 6/2010 | Yu | H04B 7/155 |
| | | | 370/252 |
| 2010/0238816 A1* | 9/2010 | Suh | H04L 25/24 |
| | | | 370/252 |

(Continued)

FOREIGN PATENT DOCUMENTS

| WO | 2004109473 A2 | 12/2004 |
| WO | 2011153507 A2 | 12/2011 |

OTHER PUBLICATIONS

Lim, S.H., et al., "Noisy Network Coding", IEEE Transactions on Information Theory, May 1, 2011, pp. 3132-3152, vol. 57, No. 5, IEEE.

(Continued)

*Primary Examiner* — Kwang B Yao
*Assistant Examiner* — Syed M Bokhari

(57) ABSTRACT

The proposed layer solution defines two or more layers of relay nodes to convey traffic data from a source node to a destination node. All of the nodes in a given layer were selected for that layer because they each satisfied a signal quality requirement specified for that layer, where all relay nodes defined in one layer simultaneously start transmitting in response to a received transmission. Due to the layered approach, the destination node may be configured to decode only the traffic data relayed by the relay nodes in the immediately preceding (final) layer while treating any remaining received signals as noise. As a result, only those access nodes most likely to significantly contribute to and improve the signal quality of traffic data received at the destination node are selected as relay nodes for a particular source-destination node pair.

21 Claims, 13 Drawing Sheets

(56) References Cited

U.S. PATENT DOCUMENTS

| | | | | |
|---|---|---|---|---|
| 2012/0176900 A1* | 7/2012 | Steer | .................. | H04L 45/12 |
| | | | | 370/235 |
| 2014/0213191 A1* | 7/2014 | Courtice | .............. | H04W 40/12 |
| | | | | 455/67.11 |
| 2014/0269278 A1* | 9/2014 | Alexander | ............. | H04L 51/38 |
| | | | | 370/230 |

OTHER PUBLICATIONS

Kolte, R., et al., "Improved Capacity Approximations for Gaussian Relay Networks", Apr. 27, 2013, pp. 1-5, retrieved on Feb. 14, 2014, retrieved from internet: http://arxiv.org/abs/1304.7308.

Hou, J., et al., "Short Message Noisy Network Coding with a Decode-Forward Option", IEEE Transactions on Information Theory, Aug. 1, 2013, pp. 1-19, IEEE.

Parvaresh, F., et al., "On Computing the Capacity of Relay Networks in Polynomial Time", 2011 IEEE International Symposium on Information Theory Proceedings, Jul. 31, 2011, pp. 1342-1346, IEEE.

Cover, T., et al., "Capacity Theorems for the Relay Channel", IEEE Transactions on Information Theory, Sep. 1, 1979, pp. 572-584, vol. 25, issue 5, IEEE Information Theory Society.

* cited by examiner

METHOD FOR IMPROVING DATA THROUGHPUT IN WIRELESS NETWORKS

The solution disclosed herein generally relates to wireless networks in which communications between a source-destination node pair are assisted by relay nodes, and more particularly to more efficiently defining and using the relay nodes that assist with the communications between a source-destination node pair.

BACKGROUND

The increased interest in and use of wireless devices for communication, entertainment, etc., has caused an exponential growth in wireless traffic. To cope with this exponential growth, service providers continue to deploy increasing numbers of wireless access nodes. The feasibility of a very dense deployment of wireless access nodes, however, is predicated on the existence of a backhaul network capable of providing high-data-rate transport for each individual access node in the network. Optical-fiber-based backhaul solutions maximize capacity, and therefore provide an attractive solution for new construction areas. However, in existing buildings and infrastructure, the cost of installing fiber to every access node as required to implement the optical-fiber backhaul solution in a very dense network can be prohibitive.

Wireless self-backhauled solutions provide a reasonable alternative to fiber-optic backhaul solutions, where the same access spectrum is used to provide transport. With wireless self-backhauling, an access node serves not only its own assigned user equipment (UEs), but it also serves its neighboring access nodes as a wireless relay node that relays traffic data to/from a destination/source node in the network. A group of self-backhauling wireless access nodes can form a multi-hop mesh network, where access nodes cooperatively transfer each other's traffic to/from the destination/source node.

For example, wireless access nodes in a network may operate as relay nodes to assist with the communication of traffic data between a source-destination node pair. Each relay node receives data from its immediate predecessor, and relays or forwards the received data to the next relay node (or to the destination node). In theory, all access nodes in a wireless network may serve as relay nodes for a source-destination node pair, and the destination node decodes the signals received from all of the relay nodes, which maximizes performance. As the number of access nodes increases, however, it becomes increasingly unrealistic/impractical to expect a source-destination node pair to use all (or even most) of the access nodes in the network as relay nodes. Thus, there remains a need for a solution that addresses the practical aspects of implementing wireless self-backhauled solutions.

SUMMARY

The solution disclosed herein defines two or more layers of relay nodes to convey traffic data from a source node to a destination node. All of the nodes in a given layer were selected for that layer because they each satisfied the same signal quality requirement specified for that layer, where all relay nodes defined in one layer simultaneously start transmitting in response to a received transmission. Further, the destination node may be configured to decode only the traffic data relayed by the relay nodes in the immediately preceding (final) layer while treating any remaining received signals as noise. As a result, only those access nodes most likely to significantly contribute to and improve the signal quality of traffic data received at the destination node are selected as relay nodes for a particular source-destination node pair. The solution disclosed herein therefore avoids relaying noisy transmissions, improves the efficiency at the relay nodes, and avoids unnecessary network interference, while allowing the traffic data to be transferred from the source node to the destination node through more than one path. Further, the solution disclosed herein reduces the number of received signals actually processed by a destination node, which results in less complexity and power consumption at the destination node.

One exemplary embodiment comprises a method of selecting a plurality of wireless relay nodes to convey traffic data from a source node to a destination node. The method comprises executing a forward pass from the source node to the destination node to define two or more layers of relay nodes to convey the traffic data from the source node to the destination node. The forward pass comprises defining a first layer of first relay nodes to include one or more of the plurality of wireless relay nodes that receive a test signal from the source node having a signal quality exceeding a first forward threshold, and defining a second layer of second relay nodes to include one or more of the plurality of wireless relay nodes not part of any other layers that receive a test signal from at least one of the first relay nodes having a signal quality exceeding a second forward threshold. The method further comprises transmitting the traffic data to each of the first relay nodes via one or more antennas.

Another exemplary embodiment comprises a source node configured to convey traffic data to a destination node via a plurality of wireless relay nodes. The source node comprises a layer circuit and a transmitter. The layer circuit is configured to initiate a forward pass from the source node to the destination node to define two or more layers of relay nodes to convey the traffic data from the source node to the destination node. The forward pass comprises defining a first layer of first relay nodes to include one or more of the plurality of wireless relay nodes that receive a test signal from the source node having a signal quality exceeding a first forward threshold, and defining a second layer of second relay nodes to include one or more of the plurality of wireless relay nodes not part of any other layer that receive a test signal from at least one of the first relay nodes having a signal quality exceeding a second forward threshold. The transmitter is configured to transmit the traffic data to each of the first relay nodes via one or more antennas.

Another exemplary embodiment comprises a method of relaying traffic data in wireless relay node comprised in one of a plurality of layers of relay nodes. The method comprises defining the wireless relay node as part of one of the plurality of layers. The method defines the relay node as such by defining the wireless relay node as part of a first layer if the wireless relay node receives a test signal from a source node having a signal quality exceeding a first threshold, and defining the wireless relay node as part of a subsequent layer if the wireless relay node receives a test signal from at least one relay node in a previous adjacent layer having a signal quality exceeding a second threshold.

Another exemplary embodiment comprises a wireless relay node comprised in one of a plurality of layers of relay nodes. The wireless relay node comprises a layer circuit configured to define the wireless relay node as part of one of the plurality of layers. The layer circuit defines the relay node as such by defining the wireless relay node as part of a first layer if the wireless relay node receives a test signal from a source node having a signal quality exceeding a first threshold, and defining the wireless relay node as part of a subsequent layer if the wireless relay node receives a test signal from at least one relay node in a previous adjacent layer having a signal quality exceeding a second threshold.

Another exemplary embodiment comprises a method of decoding traffic data at a destination node. The traffic data is conveyed from a source node to the destination node via one or more successive layers of wireless relay nodes. Each first relay node in a first layer relays traffic data received from the source node to each relay node in a subsequent adjacent layer. Each final relay node in a final layer before the destination node relays traffic data received from at least one relay node in a penultimate layer to the destination node. Each relay node in any subsequent layers not comprising the first layer and the final layer relays traffic data received from at least one relay node in a previous adjacent layer to each relay node in a subsequent adjacent layer. The method comprises receiving, at the destination node, the traffic data relayed by each final relay node in the final layer, and decoding only the traffic data received from the final relay nodes in the final layer while treating any remaining received signals as noise.

Another exemplary embodiment comprises a destination node configured to decode traffic data conveyed from a source node to the destination node via one or more successive layers of wireless relay nodes. Each first relay node in a first layer relays traffic data received from the source node to each relay node in a subsequent adjacent layer. Each final relay node in a final layer adjacent the destination node relays traffic data received from at least one relay node in a penultimate layer to the destination node. Each relay node in any subsequent layers not comprising the first layer and the final layer relays traffic data received from at least one relay node in a previous adjacent layer to each relay node in a subsequent adjacent layer. The destination node comprises a receiver and a decoding circuit. The receiver is configured to receive, via one or more antennas, the traffic data relayed by each relay node in the final layer. The decoding circuit is configured to decode only the traffic data received from the relay nodes in the final layer while treating any remaining received signals as noise.

DETAILED DESCRIPTION

Figure 1:
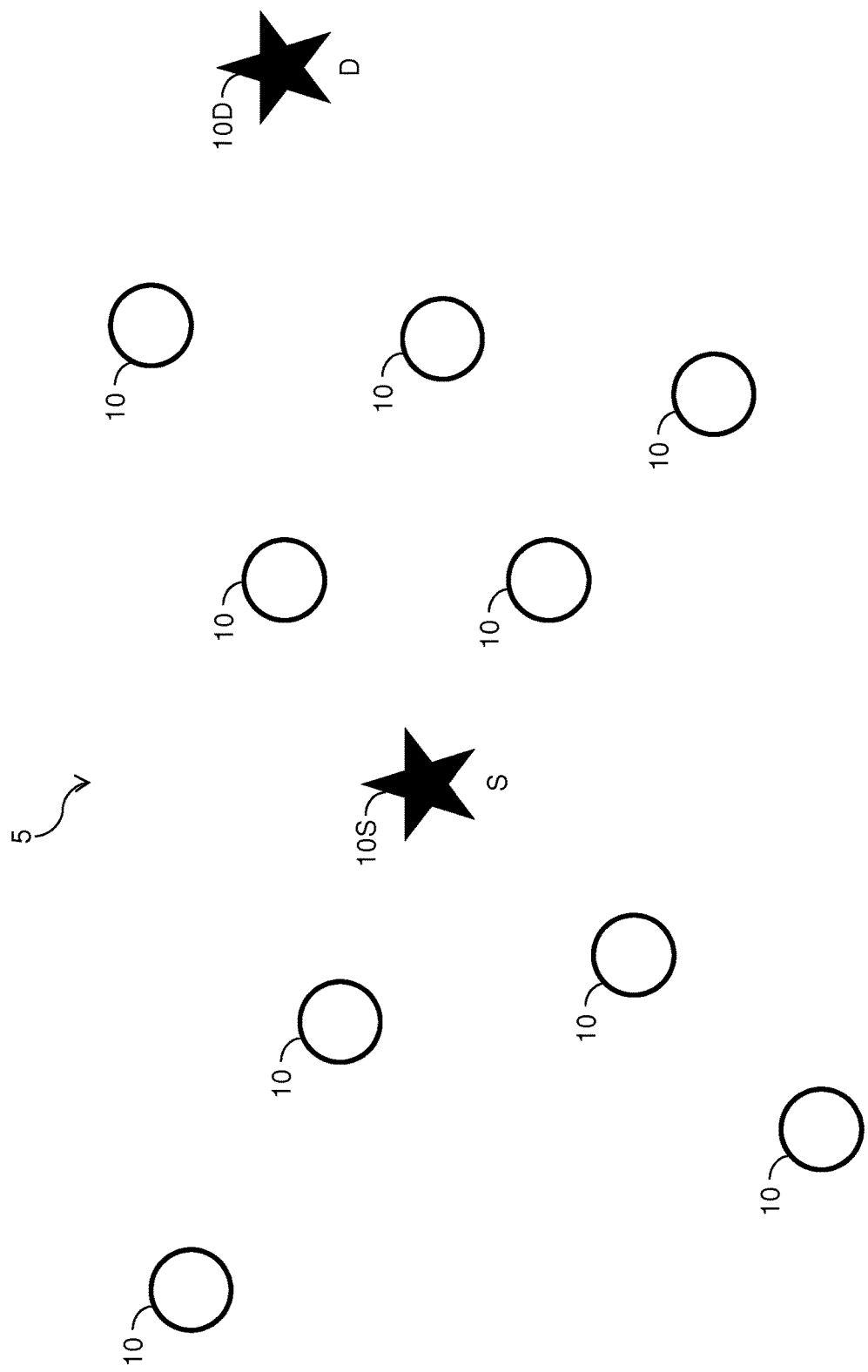
FIG. 1 shows an exemplary diagram of wireless access nodes, including one source-destination node pair.

FIG. 1 shows an exemplary wireless network 5 comprising a plurality of wireless access nodes. Each access node functions, for a given stream of traffic data, as a source node 10S, a destination node 10D, or a potential relay node 10. Traffic data may be conveyed from the source node 10S to the destination node 10D according to a chosen relaying strategy where the remaining access nodes serve as relay nodes 10. The chosen relaying strategy not only determines how the traffic data is relayed between the source-destination node pair, but it also determines the rate performance, e.g., the quantization rate and the transmission rate performance, that can be achieved for the source-destination pair.

A store-and-forward (SF) relaying strategy, also known as a routing strategy, represents one common approach for conveying traffic data between a source-destination node pair. In SF, the traffic data is transmitted from a source node 10S to a destination node 10D through relay nodes 10 positioned along a predetermined route. Each relay node 10 on the route receives data only from its immediate predecessor and forwards it to the next relay node 10 on the route until the traffic data reaches the destination node 10D. All other signals are treated as noise. In SF, the establishment of an efficient route between the source and destination nodes is critical to improving the performance. However, SF does not take advantage of the wireless channel in which a transmission from one node can be heard at many nodes. Instead, SF limits each node along the path, including the destination node 10D, to receiving signals only from one node, i.e., its immediate predecessor on the route. All other signals are treated as noise.

The network performance (e.g., data throughput, energy efficiency, reliability, etc.) can be significantly improved by deploying more advanced cooperative strategies, e.g., decode-and-forward (DF), compress-and-forward (CF), noisy network coding (NNC), and short message noisy network coding (SNNC) strategies. These more advanced cooperative strategies exploit the fact that transmissions from one node 10 can be heard at many nodes 10, and therefore improve the performance.

The CF, NNC, and SNNC relaying strategies collectively represent compression strategies. The compression strategies each, in some way, execute the following steps:

The source node 10S encodes the traffic data in a codeword of length n, and transmits the encoded traffic data such that any power constraints are satisfied.

Each relay node 10 quantizes the received signal (of length n), and encodes the index of the quantized signal with or without hashing or binning. The relay node 10 then forwards the compression index or information about the compression index to the next relay node 10 and/or to the destination node 10D.

The destination node 10D decodes the signals and quantization indexes received from all of the relay nodes 10. While each compression strategy performs some type of compression, the compression strategies differ in exactly how the above three steps are executed. For example, CF relays use hashing, whereas NNC and SNNC relays do not need to use hashing. Further, in CF, the destination node 10D first decodes quantization indexes received from all relay nodes 10, and then uses the decoded quantization index information to decode the traffic data. Also, In NNC, the destination node 10D performs joint decoding.

While DF outperforms SF, both DF and SF require that each relay node 10 on the route decodes the received data. This decoding requirement can drastically decrease the transmission rate when the relay node 10 receives traffic data via a weak link. CF, NNC, and SNNC, however, do not require the relay node 10 to decode the received traffic data. Instead, a compression relay node 10 compresses the received signal and forwards the compressed signal (e.g., the compression index or information about the index) to enable decoding at the destination node 10D. Further, unlike SF, the compression strategies do not require the establishment of a route, i.e., any type of sequential transmissions from a relay node 10 (or group of relay nodes 10). Thus, theoretical analysis of these compression strategies allows all relay nodes 10 in the network 5, even those receiving noisy signals, to compress the received signal and relay the compressed signals. The destination node 10D then performs decoding based on the compression codebooks of all the relay nodes 10. As a result, determining the transmission rate resulting from these compression strategies, and particularly for NNC and SNNC, includes the evaluation of information from all relay nodes 10 in the network 5.

The solution disclosed herein enables the relay nodes 10 used for a particular source-destination node pair to be more intelligently selected, without requiring the establishment of a route in advance. In particular, the solution disclosed herein aims to exclude those relay nodes that receive weak signals and/or are too far from the destination node 10D. To that end, the relay nodes 10 for a particular source-destination pair are selected from the available access nodes in the network 5, where each selected relay node 10 is defined as part of one or more layers of relay nodes. Each relay node 10 in a layer simultaneously starts transmitting in response to a received signal, and relay nodes 10 in different layers start their transmissions at different delays relative to the transmission from the source node 10S. The relay nodes 10 associated with a particular layer are selected for that layer based on a signal quality test. Thus, only those relay nodes 10 capable of receiving signals having sufficient signal quality are allocated to that layer. As a result, the solution disclosed herein avoids unnecessary processing at the relay nodes 10 having noisy observations of the transmitted signals, and excludes transmissions by relay nodes 10 that are very far from the destination node 10D. This exclusion is deemed acceptable because compression by such relay nodes 10 would waste resources and would provide minimal contribution to the overall performance. Further, the solution disclosed herein prevents noisy/distant relay nodes 10 from contributing to the overall interference of the network 5. While the solution disclosed herein is described in terms of the above-noted compression strategies, it will be appreciated that the layer solution disclosed herein may be used for any situation using wireless relay nodes to convey traffic data between a source-destination node pair.

Figure 2:
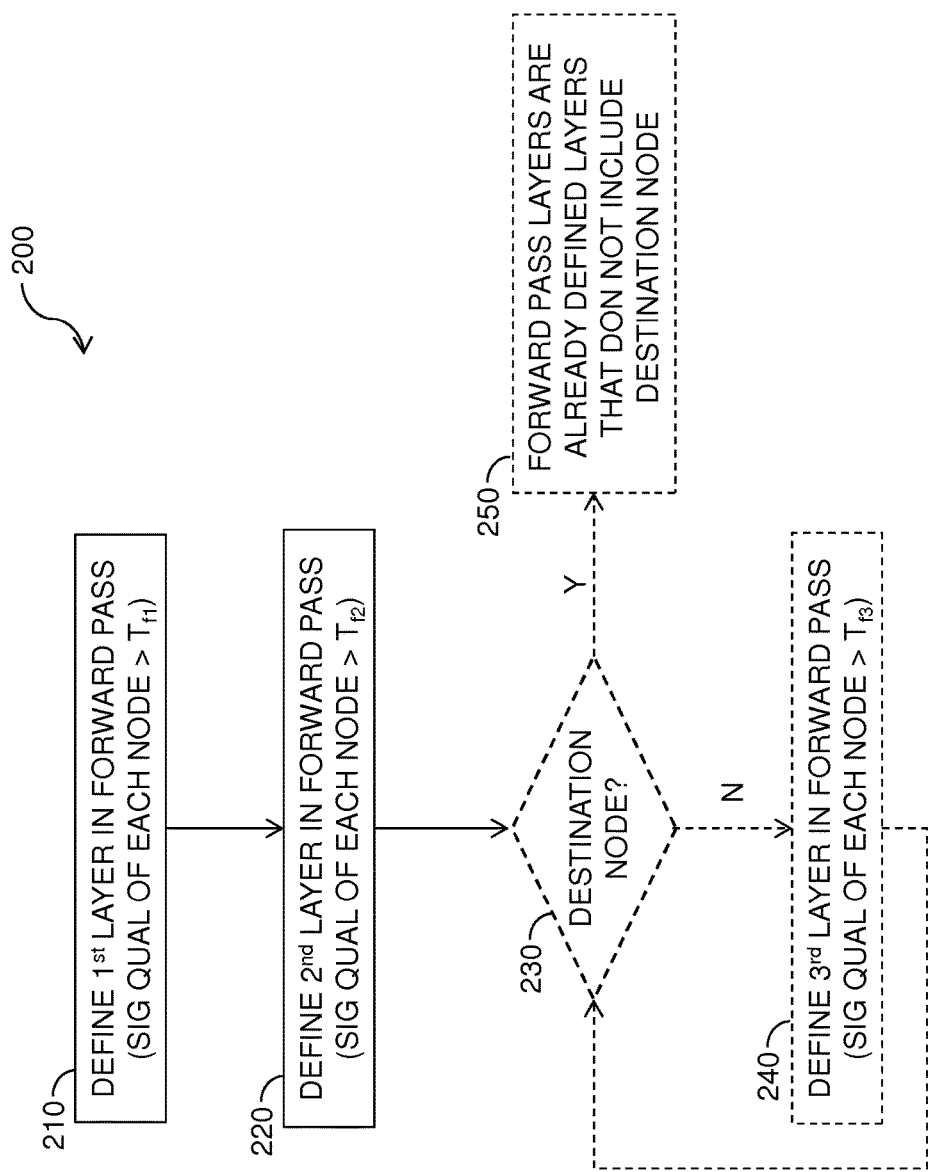
FIG. 2 shows a method of defining layers of wireless relay nodes pair according to one exemplary embodiment.

FIG. 2 shows one exemplary method 200, as executed by the source node 10S, of selecting a plurality of wireless relay nodes 10 to relay traffic data from the source node 10S to the destination node 10D. The method 200 includes executing a forward pass from the source node 10S to the destination node 10D to define at least two layers of relay nodes 10, where each layer includes at least one relay node 10. The forward pass includes defining a first layer of one or more relay nodes 10, where each relay node 10 in the first layer received a test signal from the source node 10S having a signal quality exceeding a first forward threshold $T_{f1}$ (block 210). The forward pass further includes defining a second layer of relay nodes 10 to include one or more of the relay nodes 10 not part of any other layer that received a test signal from at least one of the relay nodes 10 in the first layer having a signal quality exceeding a second forward threshold $T_{f2}$ (block 220). The method 200 may optionally include a further determination of whether the first or second layers include the destination node 10D (block 230). If not, the forward pass further includes defining a successive (e.g., third layer) of relay nodes 10 to include one or more relay nodes 10 that received a test signal from at least one of the relay nodes 10 in the immediately prior (e.g., second layer) having a signal quality exceeding a third forward threshold $T_{f3}$ (block 240). The forward pass continues in this manner—in which a number of layers may be defined—until the last preliminary layer of node(s) 10 includes the destination node 10D, at which point the forward pass layers are established as only those already defined layers that do not include the source or destination nodes (block 250).

In one exemplary embodiment, the source node 10S defines the first layer based on identification information received from the relay node(s) 10 in the first layer that determined the signal quality requirements were satisfied. The source node 10S also defines the second layer based on the identification information received by the first layer nodes from the second layer nodes, and relayed by the first layer nodes to the source node 10S. In general, the relay node(s) 10 in each layer send their identification information to the relay node(s) 10 in the preceding layer, where each relay node 10 that receives identification information relays the received identification information to the preceding layer until it reaches the source node 10S. The received identification information identifies the relay node(s) 10 and the corresponding layer. Source node 10S can then determine the number of relay nodes 10 in each layer, as well as the total number of relay nodes associated with the source-destination node pair.

Figure 3:
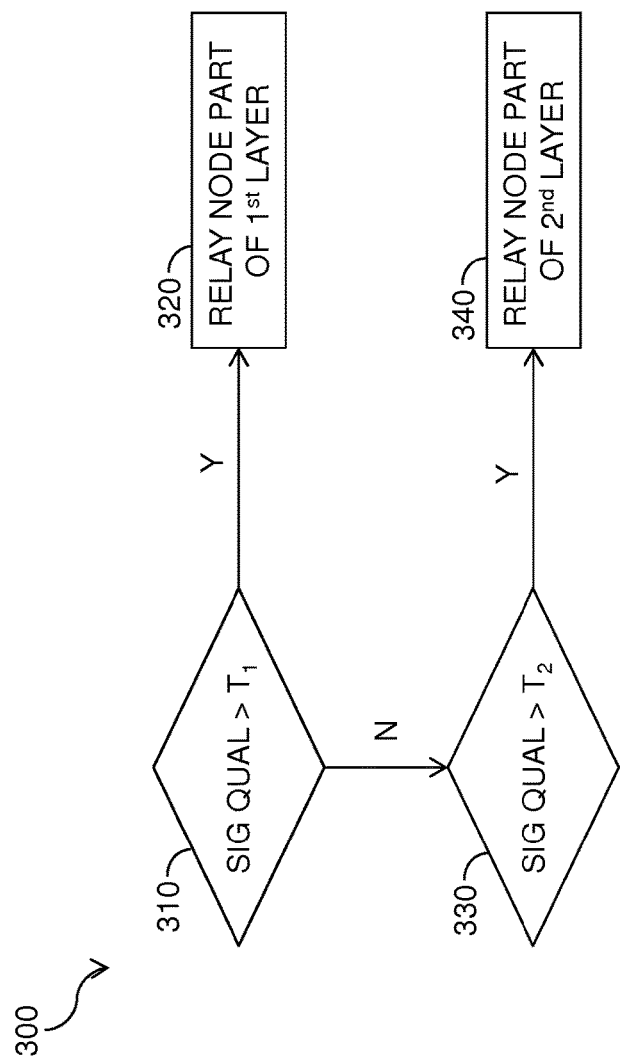
FIG. 3 shows a method of defining which layer a relay node is part of according to one exemplary embodiment.

FIG. 3 shows an exemplary method 300, as executed in a wireless access node, of defining the wireless access node as a relay node 10 for conveying traffic data between a source-destination node pair. The method 300 comprises determining whether a test signal received from the source node 10S has a signal quality exceeding a first threshold $T_1$ (block 310), and if so, defining the wireless access node as a wireless relay node 10 in a first layer (block 320). Each relay node 10 in the first layer may subsequently inform the source node 10 that it is part of the first layer, e.g., by sending its identification information and a layer 1 indicator. If the test signal quality does not exceed $T_1$, the wireless access node determines whether a test signal received from at least one relay node 10 in a previous layer, e.g., the first layer, has a signal quality exceeding a second threshold (block 330), and if so, defining the wireless access node as a wireless relay node 10 in a second layer (block 330). Each relay node 10 in the second layer subsequently informs the relay node 10 in the previous layer, which sent the test signal, that it is part of the second layer, e.g., by sending its identification information and a layer two indicator, where the first layer relay node 10 forwards the received identification information to the source node 10S. When the wireless relay node 10 is defined as part of the first layer, the relay node 10 relays traffic data received from the source node 10S to each relay node 10 in a subsequent adjacent layer. When the wireless relay node 10 is defined as part of a final layer before the destination node 10D, the relay node 10 relays traffic data received from each relay node in a penultimate layer, adjacent to the final layer, to the destination node 10D. When, however, the wireless relay node 10 is defined as part of layer $L_k$, which is not the first layer or the final layer, the relay node 10 relays traffic data received from each relay node 10 in a previous adjacent layer $L_{k-1}$ to each relay node 10 in a subsequent adjacent layer $L_{k+1}$.

Figure 4:
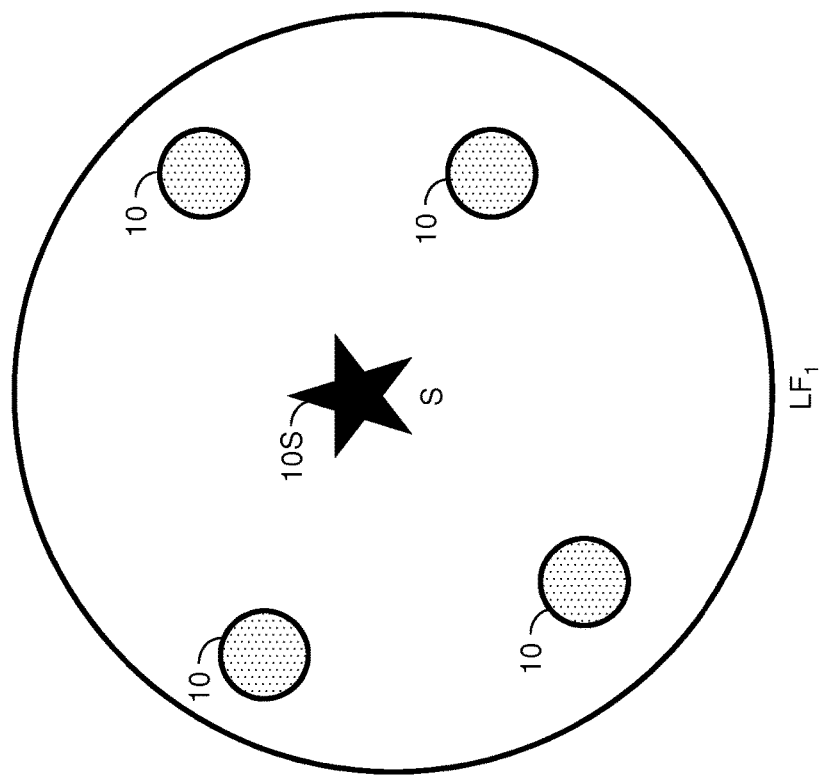
FIG. 4 shows a preliminary first layer of relay nodes resulting from a forward pass according to one exemplary embodiment.
Figure 5:
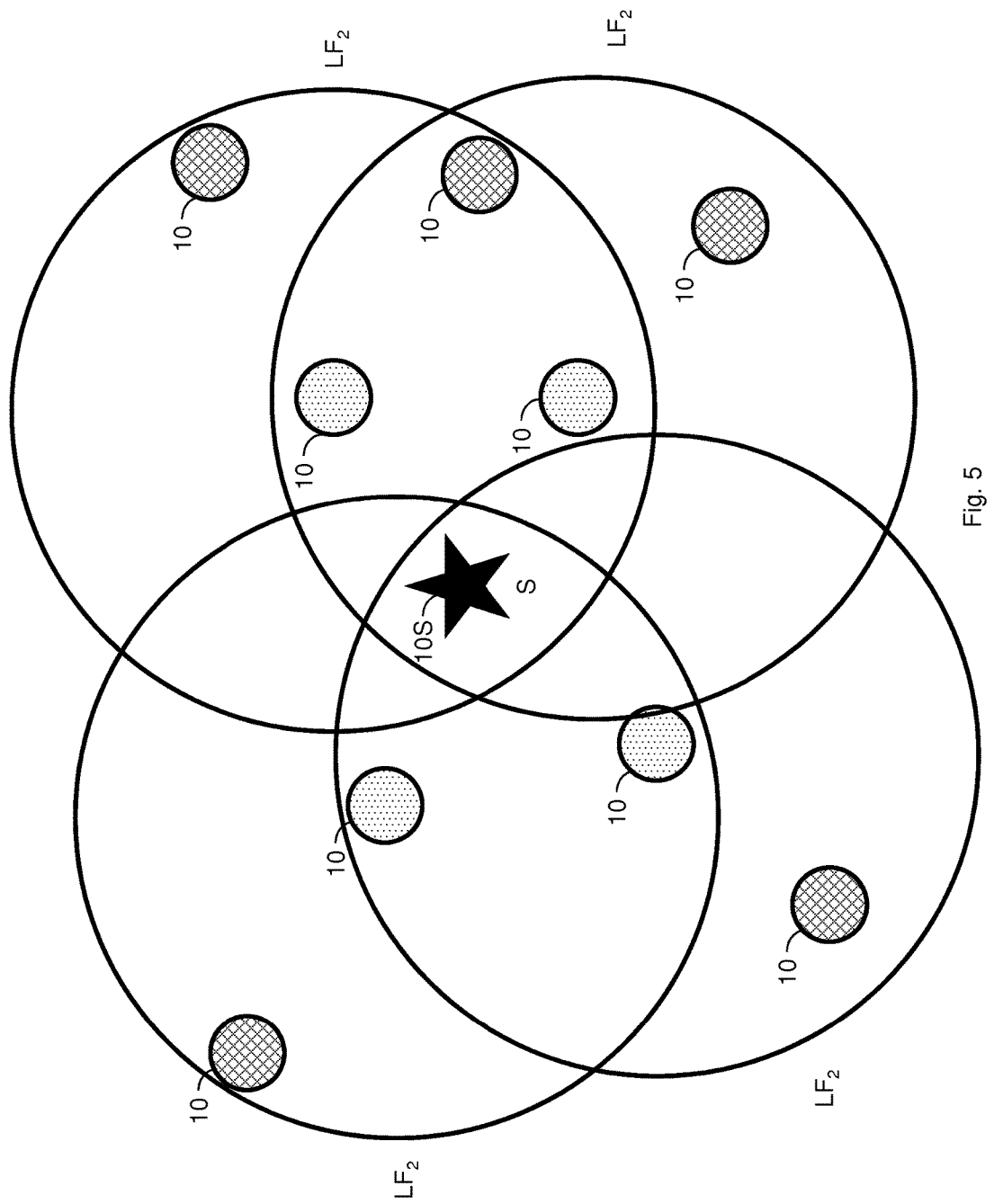
FIG. 5 shows a preliminary second layer of relay nodes resulting from a forward pass according to one exemplary embodiment.
Figure 6:
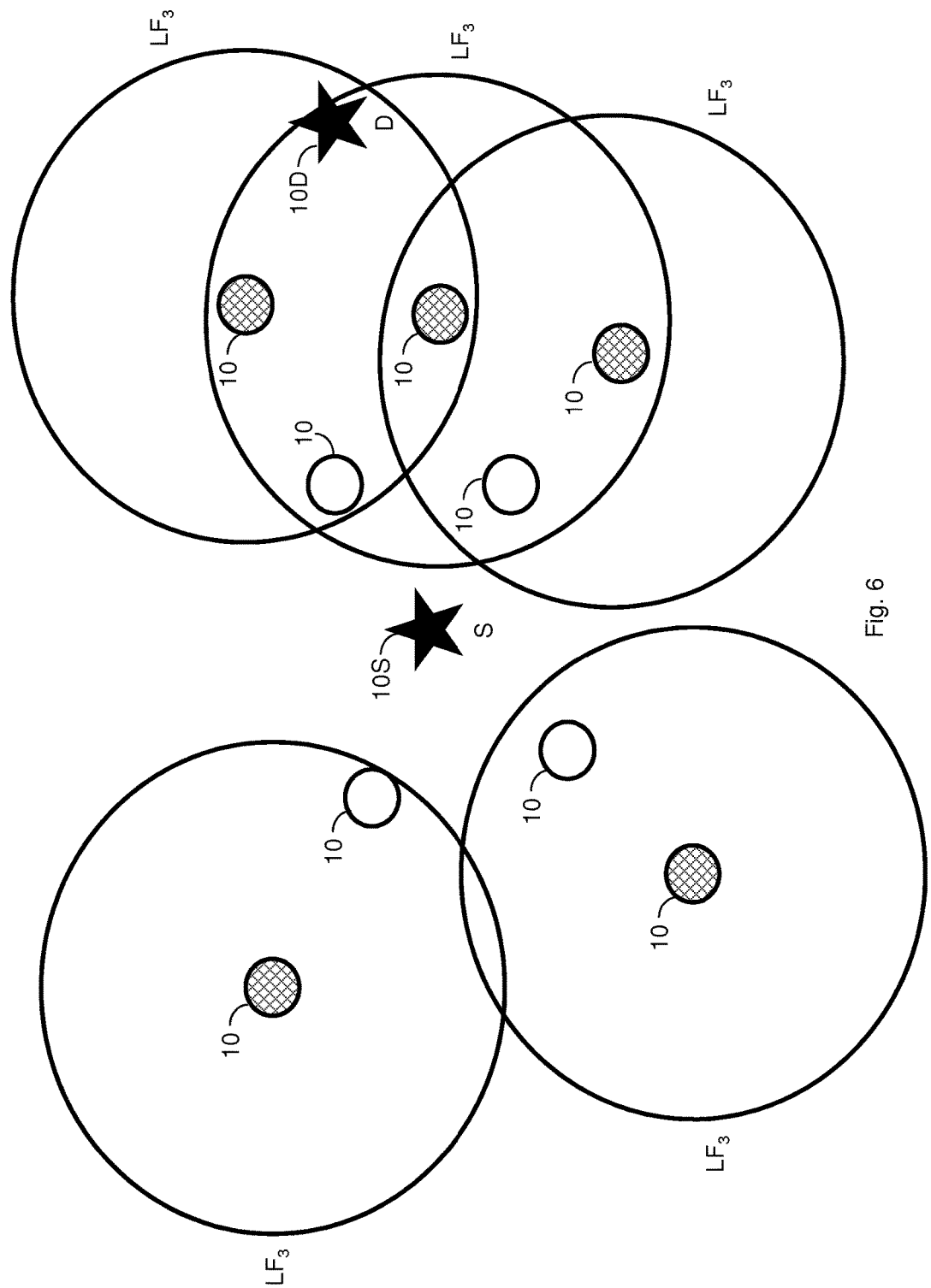
FIG. 6 shows a preliminary third layer of relay nodes resulting from a forward pass according to one exemplary embodiment.
Figure 7:
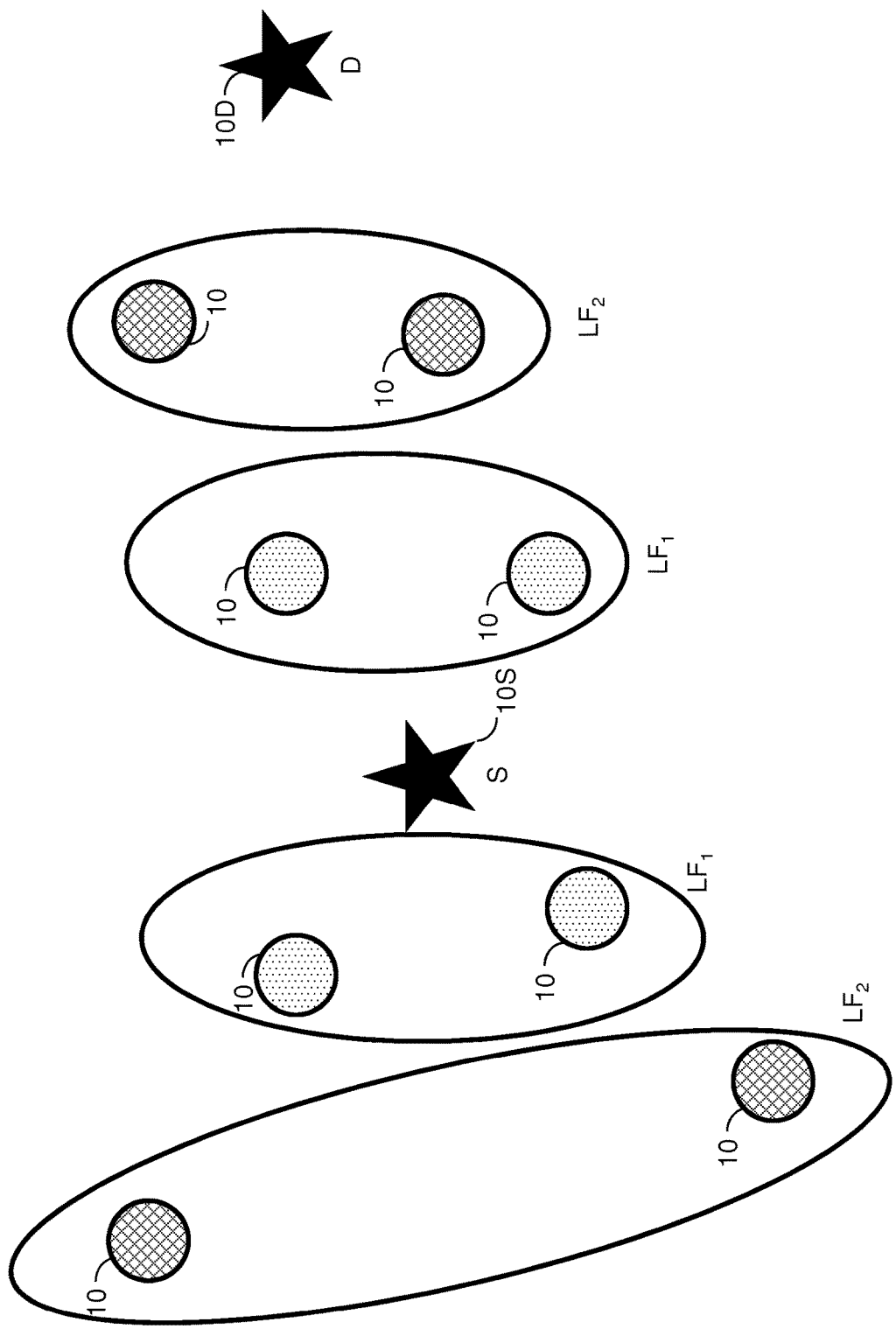
FIG. 7 shows the first and second layers of relay nodes resulting from a forward pass according to one exemplary embodiment.

An exemplary test signal comprises a pilot signal and exemplary signal qualities include a signal-to-noise ratio, a signal-to-interference plus noise ratio, etc. For example each of the outward neighbor access nodes in the network 5 that receives a pilot signal from the source node 10S having an SINR>$T_{f1}$ is defined as being a relay node 10 for a first forward pass layer $LF_1$, as shown in FIG. 4. Each outward neighbor access node in the network 5 that receives a pilot signal from at least one of the first layer relay nodes 10, from the forward pass, having an SNR>$T_{f2}$ is defined as part of a second forward pass layer $LF_2$, as shown in FIG. 5. The circles in FIG. 5 are each centered on a first forward pass layer relay node 10, indicated by dotted shading, and each circle includes one or more second forward pass layer relay nodes 10, indicated by hashed shading. If $LF_2$ does not include the destination node 10D, as shown in FIG. 5, the forward pass continues in this manner, e.g., by defining each outward neighbor access node in the network 5 that receives a pilot signal from at least one of the second layer relay nodes 10 having an SNR>$T_{f3}$ as part of a third forward pass layer $LF_3$, as shown in FIG. 6, where the third layer circles are centered on the second layer relay nodes 10. Because the destination node 10D is contained in at least one of the third forward pass layers, the destination node 10D is an outward neighbor node of one of the second layer relay nodes 10, and the third forward pass layer is not formed. The first and second forward pass layers are therefore those layers having dotted and hashed nodes, respectively, as shown in FIG. 7. In general, the $k^{th}$ forward pass layer may be mathematically defined by:

$$LF_k = \left( \bigcup_{i:i \in LF_{k-1}} N(i) \right) \setminus \left( \{s\} \cup \bigcup_{j=1}^{k-1} LF_j \right), \quad (1)$$

where N(i) represents an outward neighbor of relay nodes i, {s} represents the index of the source node 10S, $LF_j$ represents the set of indices of relay nodes 10 in the $j^{th}$ forward pass layer, and where an outward neighbor of node i represents a neighboring relay node receiving a test signal from node i. It is important to note that relay nodes 10 defined as part of previous layers are excluded from being defined as part of a subsequent layer. Thus, all layers formed with the forward pass are disjoint.

Figure 8:
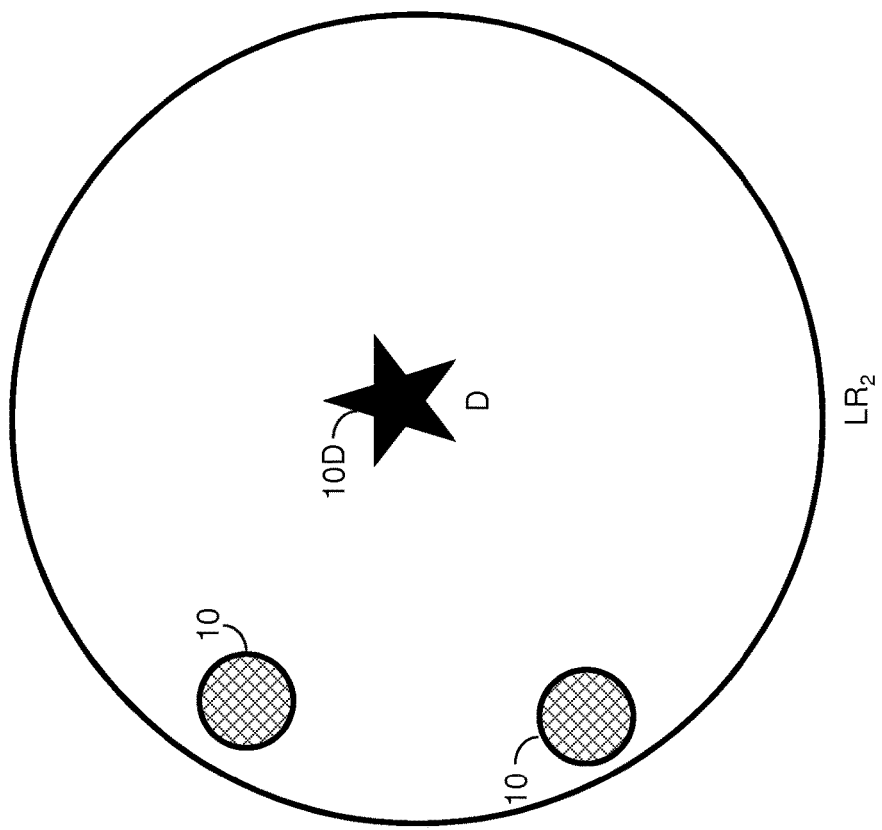
FIG. 8 shows the preliminary second layer of relay nodes resulting from a reverse pass according to one exemplary embodiment.
Figure 9:
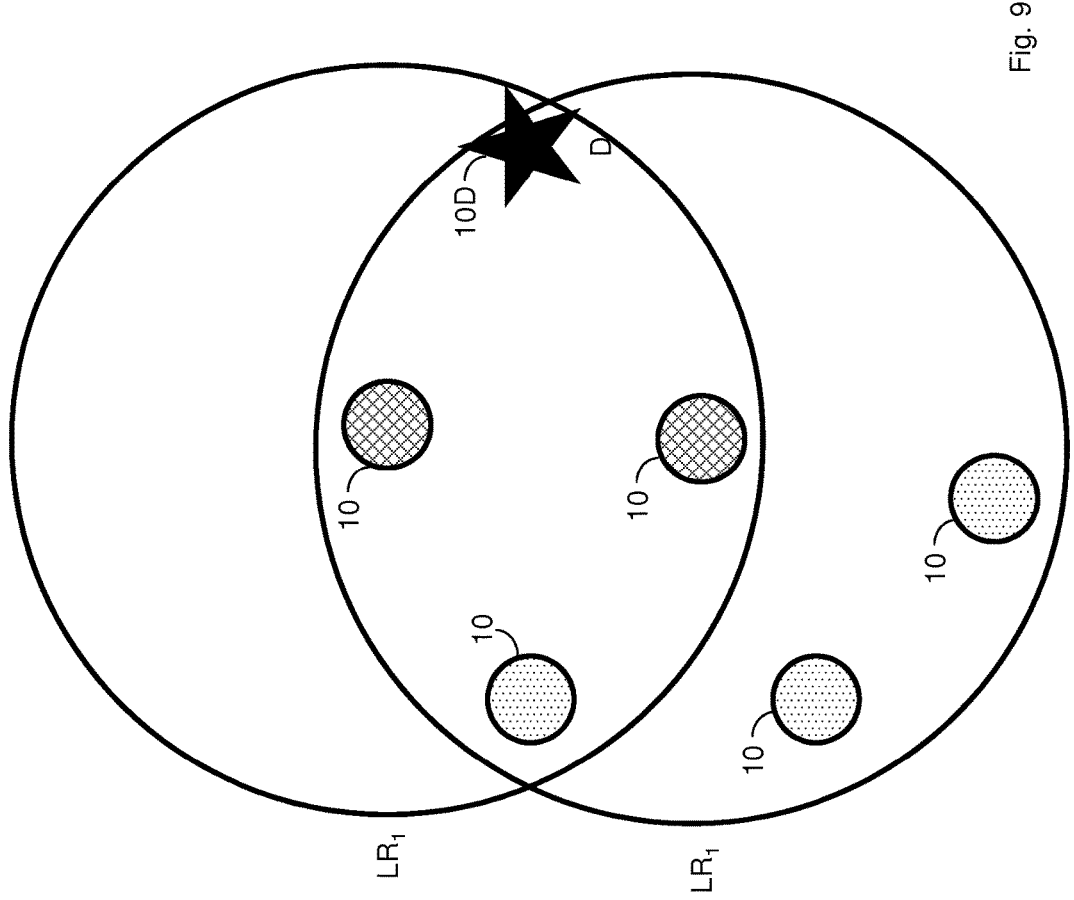
FIG. 9 shows the preliminary first layer of relay nodes resulting from a reverse pass according to one exemplary embodiment.
Figure 10:
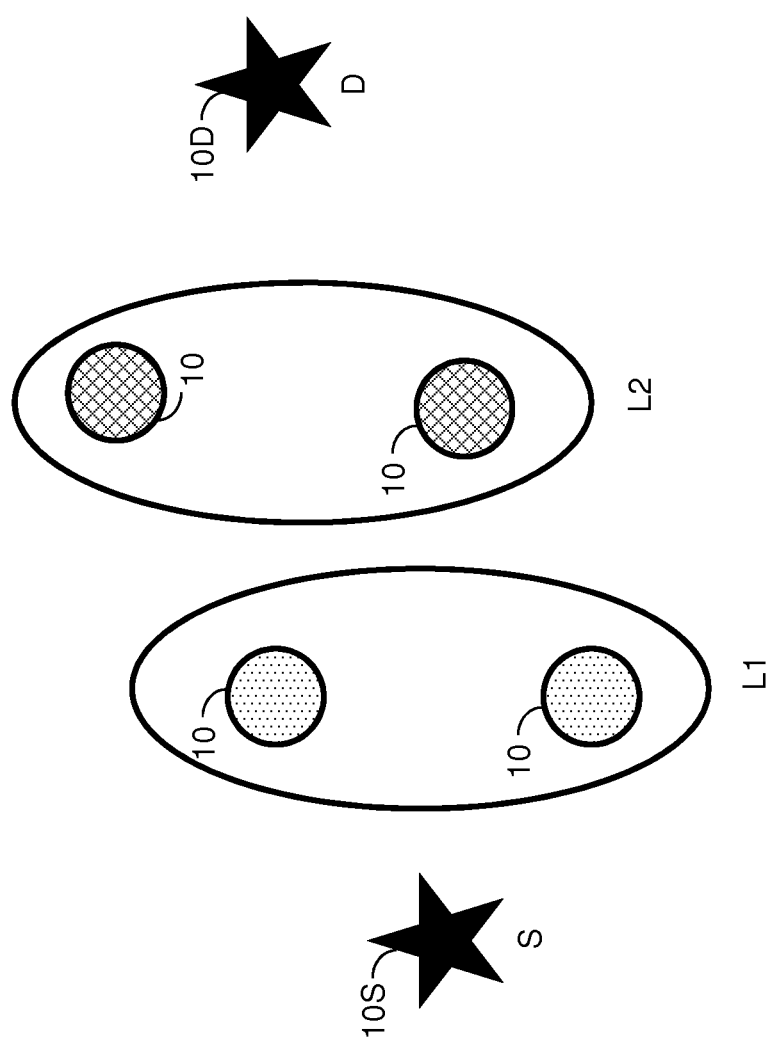
FIG. 10 shows the final first and second layers of relay nodes resulting from the forward and reverse passes according to one exemplary embodiment.

While the layers of nodes 10 defined by the forward pass, as shown in FIG. 7, may be used to convey traffic data between a source-destination node pair, the forward pass may include nodes not intermediate to a source-destination pair, and thus may not optimally define the best relay nodes 10 for the particular source-destination node pair. In one exemplary embodiment, an optional reverse pass may also be executed to further refine the layers defined in the forward pass, as shown in FIGS. 8-10. More particularly, each of the inward neighbor relay nodes 10 in the second forward pass layer that sends a pilot signal to the destination node 10D and attains an SNR>$T_{r2}$ (a second reverse pass signal quality threshold) is defined as being a relay node 10 for the second reverse pass layer $LR_2$, as shown in FIG. 8, where $LR_2$ represents a set of indices of nodes in the second reverse pass layer. Each of the inward neighbor relay nodes 10 in the first forward pass layer that sends a pilot signal to at least one of the second reverse pass layer relay nodes 10 and attains an SNR>$T_{r2}$ (a first reverse pass signal quality threshold) is defined as being a relay node 10 for the first reverse pass layer $LR_1$, as shown in FIG. 9. The relay nodes 10 common to both the first forward pass layer and the first reverse pass layer are defined as being part of the final first layer, and the relay nodes 10 common to both the second forward pass layer and the second reverse pass layer are defined as being part of the final second layer, as shown in FIG. 10. More particularly, the layers k=K, . . . , 1 may be finally defined according to:

$$L_k = \left( \bigcup_{i:i \in LF_{k+1}} \overline{N}(i) \right) \cap LF_k \quad (2)$$

where $\overline{N}(i)$ represents an inward neighbor of relay node i, and where an inward neighbor of relay node i represents the relay node sending a test signal to relay node i. Because $L_k$ is a subset of $LF_k$, and because all the forward pass layers $\{LF_k\}_{k=1}^K$ are disjoint, the finalized layers $\{L_k\}_{k=1}^K$ are also disjoint. While FIGS. 4-10 only show two layers of nodes, it will be appreciated that additional layers may be generated, e.g., when the source and destination nodes are farther apart.

Briefly revisit benefits (in general and re reverse pass) while pointing to FIG. 10.

Once the layers of relay nodes 10 have been defined, the quantization rate and/or the transmission rate applicable to such a layer-specific strategy may be determined. For example, the quantization rate (in bits per sample) for nodes in the $i^{th}$ layer may be computed as:

$$r_j = \frac{1}{2}(\log_2 SQR_j + \gamma_j), \quad (3)$$

where $SQR_j$ denotes the target signal-to-quantization-noise-ratio (SQR) for nodes in the $i^{th}$ layer, and $\gamma_j \geq 0$ is a quantity that is characterized by the quantization scheme adopted by the nodes in the $j^{th}$ layer. A reasonable way of choosing the target SQR is to set it to according to the signal quality threshold (e.g. the same as the SNR threshold, $T_{fj}$ or $T_{rj}$). The transmission rate for communication between the $((j-1)^{th}$ layer and the $j^{th}$ layer may then be set according to the quantization rate $\gamma_j$.

Figure 11:
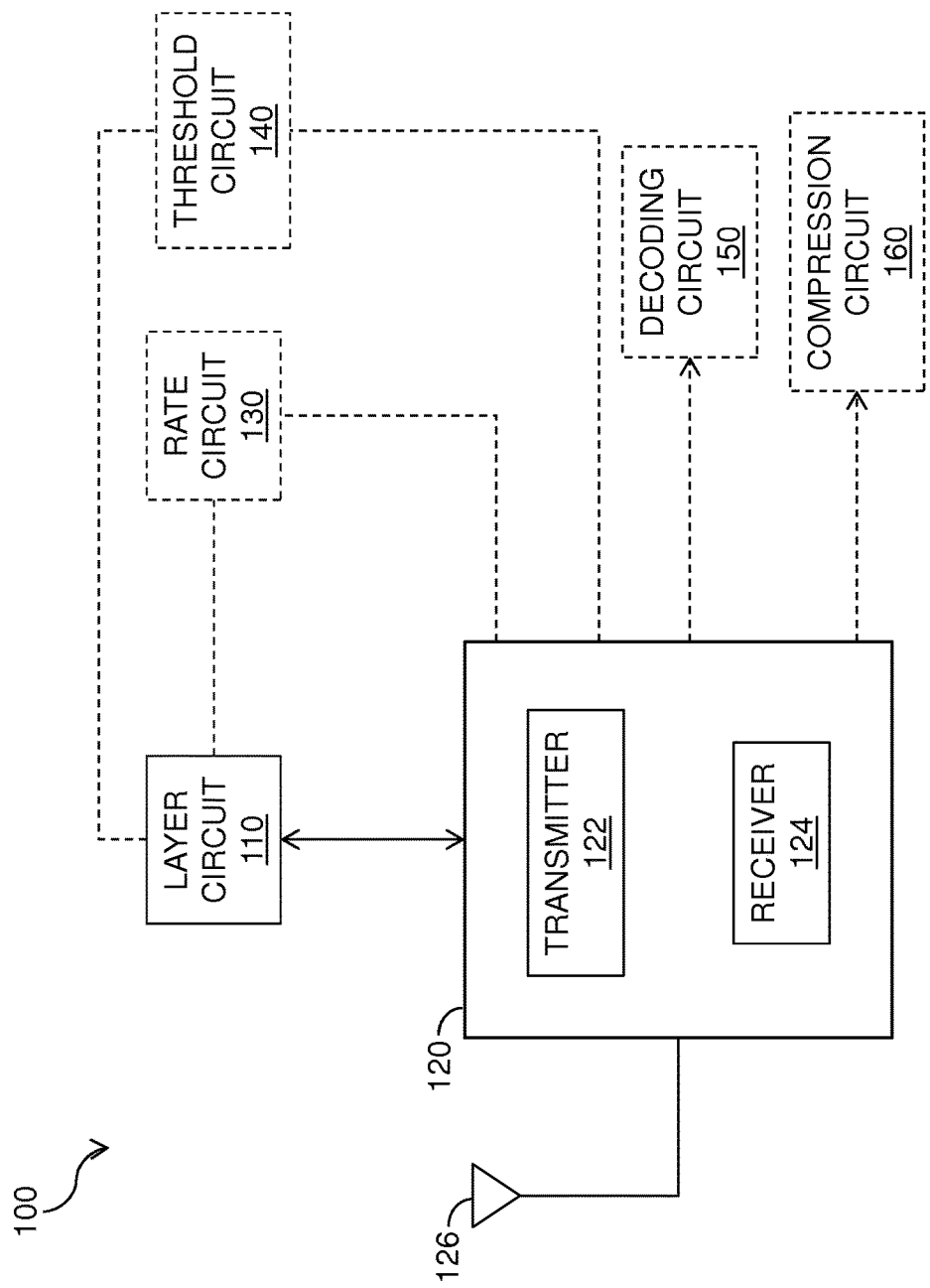
FIG. 11 shows a block diagram of an access node according to one exemplary embodiment.

FIG. 11 shows a block diagram for a wireless access node 100 according to one exemplary embodiment. The access node 100 of FIG. 11 may comprise any of the source node 10S, destination node 10D, or relay nodes 10 in the wireless network 5. The access node 100 comprises a layer circuit 110 and a transceiver 120. Layer circuit 110 executes the necessary steps to define one or more layers of relay nodes in the wireless network 5. When part of a source node 10S, layer circuit 110 is configured to initiate a forward pass from the source node 10S to the destination node 10D to define two or more layers of relay nodes 10 to convey traffic data between the source-destination node pair, e.g., according to the method of FIG. 2. When part of a potential relay node 10, the layer circuit 110 is configured to define the relay node 10 as part of one of a plurality of layers, e.g., according to the method of FIG. 3. The transceiver 120 comprises a transmitter 122 for transmitting wireless signals, e.g., test signals, traffic data, compressed signals, etc., via antenna 126, and a receiver 124 for receiving wireless signals, e.g., test signals, traffic data, compressed signals, etc., via antenna 126. The transceiver 120 may operate according to any known wireless technology and/or standard.

Access node 100 may also include other optional circuits, e.g., rate circuit 130, threshold circuit 140, decoding circuit 150, and compression circuit 160, which execute node-specific operations when applicable. For example, the rate circuit 130 is configured to determine a transmission rate and/or a quantization rate based on the defined layers of relay nodes 10 as previously discussed.

The threshold circuit 140 is configured to determine the layer-specific thresholds. For example, the threshold circuit 140 may receive the layer-specific thresholds from a remote network node, from one of the relay nodes 10, or from the source node 10S. Alternatively, the threshold circuit 140 may compute the layer-specific thresholds based on network parameters and operating conditions. For example, the threshold circuit 140 may define (or redefine) the one or more of the thresholds based on a desired layer density and/or to ensure control signaling between neighboring nodes can be communicated with high reliability. It will be appreciated that each layer may be defined using different thresholds, and/or that some layers may be defined using the same threshold.

Figure 12:
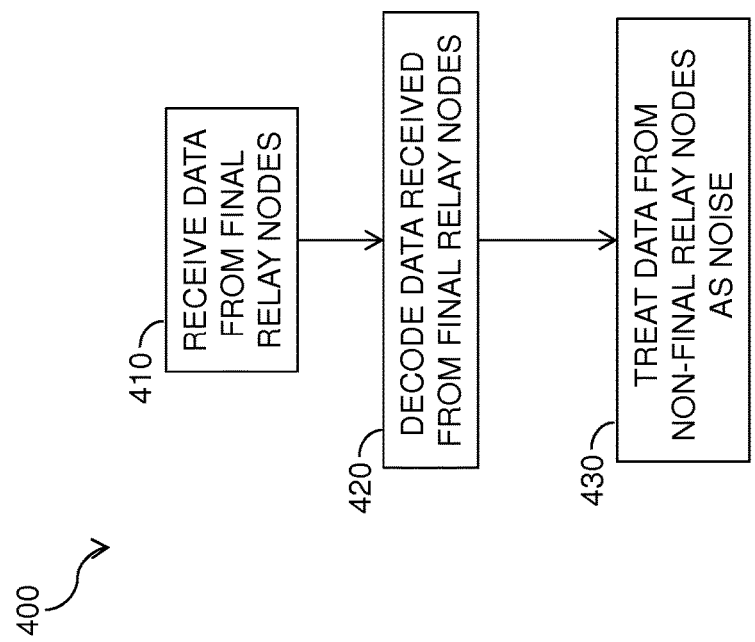
FIG. 12 shows a method of decoding traffic data at a destination node according to one exemplary embodiment.

Decoding circuit 150 and compression circuit 160 are configured to respectively decode and compress traffic data received by transceiver 120. The decoding circuit 150 may use any known decoding technique, including but not limited to, backward decoding, joint decoding, or sliding-window decoding. When part of the destination node 10D, for example, the decoding circuit 150 may be configured to decode only the traffic data received from the relay nodes 10 in the final layer immediately preceding the destination node 10D while treating any remaining received signals as noise, e.g., according to the method 400 shown in FIG. 12. For example, the transceiver 120 may receive traffic data from the relay node(s) 10 in the final layer and signals from relay node(s) outside the final layer (block 410). The decoding circuit 150 decodes the traffic data received from the final layer relay node(s) 10 (block 420), and treats any signals from relay node(s) outside the final layer as noise (block 430). In some embodiments, the decoding circuit 150 in the destination node 10D may also use some measure of signal quality, e.g., SINR, to determine which of the signals received from the final layer 10 to decode. In this case, the decoding circuit 150 treats all signals received from nodes outside the final layer, and any signals received from the relay node(s) 10 of the final layer that do not pass the signal quality measurement, as noise.

When part of a relay node 10 in one of the defined layers, the decoding circuit 150 and/or compression circuit 160 may be configured to decode and/or compress received traffic data. For example, each relay node 10 in each layer may include a compression circuit 160 that automatically performs compression according to any known technique, e.g., NNC, SNNC, or CF, before forwarding the compressed data. In another embodiment, one or more of the relay nodes 10 may instead include a decoding circuit 150 that decodes the received traffic data before forwarding.

In still another embodiment, one or more of the relay nodes 10 may use the decoding circuit 150 and compression circuit 160 to perform a cooperative strategy. In this scenario, the procedure used to establish the layers of relay nodes 10 assumes compression at each relay node 10. During the transmission of traffic data, however, each relay node 10 may selectively choose to decode or compress the received traffic data before proceeding with any forwarding operations. For example, the decoding circuit 150 may be configured to decode the traffic data received at the $i^{th}$ relay node 10 before relaying the traffic data to the destination node 10D or to a relay node 10 in a subsequent layer when the received traffic data has a measured signal quality (e.g., SINR) exceeding a test signal quality needed to achieve a desired transmission rate (e.g., $SINR_{th}$), e.g., when $SINR > SINR_{th}$. When $SINR \le SINR_{th}$, however, the compression circuit 160 is configured to instead compress the traffic data, e.g., using SNNC, before forwarding the compressed signal. In this embodiment, the transmission rate calculated for the defined layers of relay nodes 10 may be updated based on the number of relay nodes 10 that decode the received traffic data instead of compressing it. For example, let V denote the set of relay nodes 10 receiving signals with sufficient quality to perform decoding, where the remaining relay nodes 10 perform compression. Because the V decoding relay nodes 10 do not propagate the quantization noise, the change from compression to decoding in V of the total relay nodes 10 increases the transmission rate in each of these R decoding relay nodes 10 from R to $R^+$, where $R^+$ is computed using a similar approach used to compute R, and where the new transmission rate may be calculated according to:

$$R_{new} = \min(R^+, R_{min}) \quad (4)$$

where $R_{min}$ represents the rate corresponding to $$\min_{i \in V}(SINR_i).$$

It should be noted that all of the V decoding relay nodes 10 were able to decode signals transmitted with rate R. However, because $R^+ > R$, there is no guarantee that all of the V decoding relay nodes 10 can still decode at this increased rate. Equation (4) thus guarantees that all relay nodes 10 in the set of V decoding relay nodes 10 can still decode at the increased transmission rate.

According to the solution disclosed herein, the performance of the layers of relay nodes is bound by the layer having the minimum number of relay nodes 10, particularly for NNC and SNNC compression strategies. The reason is that compression strategies across layers can achieve multiple-input, multiple-output (MIMO) channel gains. In particular, if each layer includes M relay nodes, the achievable rate is on the order of an M×M MIMO channel. When different layers have different numbers of relay nodes 10, and particularly when the difference is dramatic, the optimum performance is not achieved. To improve the performance of the layer solution proposed herein under such circumstances, the source node 10S may implement a redefinition process to redefine the layers defined by the original forward and/or reverse passes, e.g., to create the same number of relay nodes 10 in each layer. This improved performance necessarily requires additional control signaling, but the benefits often outweigh such a disadvantage. It will be appreciated that while the redefinition process is described in terms of each defined (or redefined) layer having the same number of relay nodes 10, such is not required. Instead, the source node 10S may alternatively decide to increase or decrease the number of relay nodes 10 in a layer to simply reduce the bottleneck effect.

Figure 13:
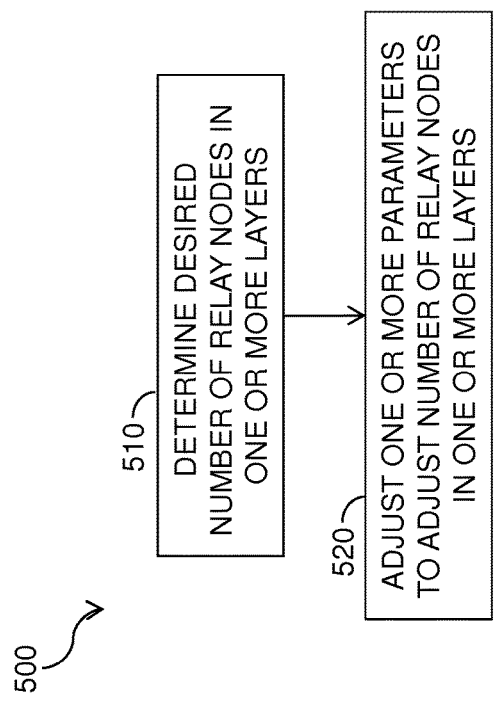
FIG. 13 shows a method of refining the number of relay nodes in one or more of the already defined layers.

An exemplary method 500 for achieving this improvement is shown in FIG. 13, where the source node 10S evaluates the number of relay nodes 10 in each layer, and selects a desired number of relay nodes 10 (block 510). The source node 10S then initiates a redefinition process to adjust the number of relay nodes 10 in each previously defined layer to match the desired number of relay nodes 10 (block 520). To that end, the layer circuit 110 and/or the threshold circuit 140 may adjust one or more parameters, e.g., the transmission power of the test signal, the signal quality threshold, etc., to adjust the number of relay nodes 10 in each layer. For example, to increase the number of included relay nodes 10 in a layer having too few relay nodes 10, the threshold circuit 140 (in the source node 10S or a relay node 10) may decrease the threshold for that layer, or the layer circuit 110 in the source node 10S may direct the transceiver 120 to increase the transmission power used to send test signals to that layer. Similarly, to decrease the number of included relay nodes 10 in a layer having too many relay nodes 10, the threshold circuit 140 (in the source node 10S or a relay node 10) may increase the threshold for that layer. or the layer circuit 110 in the source node 10S may direct the transceiver 120 to decrease the transmission power used to send test signals to that layer.

The layer solution disclosed herein has several advantages over conventional relay solutions, and particularly over conventional compression relay solutions. For example, the layer solution disclosed herein establishes a sequence of transmissions, a kind of generalized routing, between the source-destination node pair, where the relay nodes in a particular layer all transmit at the same delay relative to the initial traffic data transmissions from the source node 10S. This generalized routing improves coordination within the network 5, which is particularly important in indoor environments where access nodes cannot always detect transmissions from the source node 10S directly due to obstructions from walls. In such an environment, the conventional solution, where all the relay nodes 10 in the network transmit at the same time, is not feasible. The proposed layer solution also avoids transmissions from nodes that have very noisy observations, which improves energy efficiency at the relay nodes 10 and avoids unnecessary interference with other nodes. In addition, the proposed layer solution enables simplified decoding procedure and/or structure at the destination node 10D relative to conventional solutions because the decoding circuit 150 in the destination node 10D only decodes signals received from a select subset of relay nodes 10, e.g., the relay nodes 10 in the final layer.

While the solution disclosed herein was presented in terms of a single source-destination node pair, it will be appreciated that the layer solution disclosed herein may easily be generalized to multiple source-destination node pairs.

The solution disclosed herein may be implemented in any network 5 where data is sent through relay nodes, where each relay node may comprise a half-duplex or a full-duplex relay node, and where each relay node may have one or more antennas. Thus, the solution disclosed herein applies in general to wireless networks, and in particular to wireless applications including, but not limited to, multi-hop backhaul, network assisted device-to-device (D2D) communications, and cellular networks with relays. For example, when some number of the relay nodes in one or more of the layers only support half-duplex communications, the first layer may be further defined such that transceiver 120 in each relay node 10 in a half-duplex layer divides the time slots (or other time-based signal portions) into first time portions for signal transmission and second time portions for signal reception. The first and second portions of time are therefore configured to alternate between relaying traffic data and receiving traffic data, respectively, to accommodate the half-duplex communications.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of selecting a plurality of wireless relay nodes to convey traffic data from a source node to a destination node, the method comprising: executing a forward pass from the source node to the destination node to define two or more layers of relay nodes to convey the traffic data from the source node to the destination node, the forward pass comprising: defining a first layer of first relay nodes to include one or more of the plurality of wireless relay nodes that receive a test signal from the source node having a signal quality exceeding a first forward threshold; and defining a second layer of second relay nodes to include one or more of the plurality of wireless relay nodes not part of any other layer that receive a test signal from at least one of the first relay nodes having a signal quality exceeding a second forward threshold; redefining each of the first and second layers based on a reverse pass performed from the destination node to the source node, wherein redefining the second layer comprises redefining the second layer to include one or more of the second relay nodes defined in the forward pass that receives a test signal from the destination node having a signal quality exceeding a first reverse threshold; and wherein redefining the first layer comprises redefining the first layer to include one or more of the first relay nodes defined in the forward pass that receives a test signal from at least one of the second relay nodes having a signal quality exceeding a second reverse threshold; and transmitting the traffic data to each of the first relay nodes via one or more antennas.

2. The method of claim 1 wherein if neither the first layer nor the second layer include the destination node, further defining a third layer of third relay nodes to include one or more of the plurality of wireless relay nodes that receive a test signal from at least one of the second relay nodes having a signal quality exceeding a third forward threshold.

3. The method of claim 1 further comprising transmitting traffic data from the source node to each of the first relay nodes to enable the first relay nodes to relay received traffic data to each of the second relay nodes, and to enable the second relay nodes to relay traffic data received by each of the second relay nodes to the destination node.

4. The method of claim 1: wherein defining the first layer of first relay nodes comprises receiving, at the source node, a relay node identity from each of the first relay nodes having the signal quality exceeding the first reverse threshold; and wherein defining the second layer of second relay nodes comprises receiving, at the source node, a relay node identity from each of the second relay nodes having the signal quality exceeding the second reverse threshold.

5. The method of claim 4 further comprising refining at least one of the first and second layers to adjust at least one of a number of the first relay nodes and a number of the second relay nodes to at least one of a first desired number of first relay nodes and a second desired number of second relay nodes by adjusting, at the source node, at least one of the first forward threshold, the second forward threshold, the first reverse threshold, and the second reverse threshold.

6. The method of claim 1 further comprising refining at least one of the first and second layers to adjust at least one of a number of the first relay nodes and a number of the second relay nodes by adjusting, at the source node, at least one of the first and second forward thresholds.

7. The method of claim 1:
wherein defining the first layer of first relay nodes comprises receiving, at the source node, a relay node identity from each of the first relay nodes having the signal quality exceeding the first forward threshold; and
wherein defining the second layer of second relay nodes comprises receiving, at the source node, a relay node identity from each of the second relay nodes having the signal quality exceeding the second forward threshold.

8. The method of claim 1 further comprising computing at least one of a transmission rate and a quantization rate based on the defined first layer of first relay nodes and the defined second layer of second relay nodes.

9. The method of claim 1 further comprising determining, at the source node, the first and second forward thresholds.

10. A source node configured to convey traffic data to a destination node via a plurality of wireless relay nodes, the source node comprising: a layer circuit configured to: initiate a forward pass from the source node to a destination node to define two or more layers of relay nodes to convey the traffic data from the source node to the destination node, the layer circuit configured to execute the forward pass by: defining a first layer of first relay nodes to include one or more of the plurality of wireless relay nodes that receive a test signal from the source node having a signal quality exceeding a first forward threshold; and defining a second layer of second relay nodes to include one or more of the plurality of wireless relay nodes not part of any other layer that receive a test signal from at least one of the first relay nodes having a signal quality exceeding a second forward threshold; and refine each of the first and second layers via a reverse pass performed from the destination node to the source node by: redefining the second layer to include one or more of the second relay nodes defined in the forward pass that receives a test signal from the destination node having a signal quality exceeding a first reverse threshold; and redefining the first layer to include one or more of the first relay nodes defined in the forward pass that receives a test signal from at least one of the second relay nodes having a signal quality exceeding a second reverse threshold; and a transmitter configured to transmit the traffic data to each of the first relay nodes via one or more antennas.

11. The source node of claim 10 wherein if neither the first nor second layers include the destination node, the layer circuit is further configured to define a third layer of third relay nodes to include one or more of the plurality of wireless relay nodes that receive a test signal from at least one of the second relay nodes having a signal quality exceeding a third forward threshold.

12. The source node of claim 10:
wherein the layer circuit defines the first layer of first relay nodes by receiving a relay node identity from each of the first relay nodes having the signal quality exceeding the first forward threshold; and
wherein the layer circuit defines the second layer of second relay nodes by receiving a relay node identity from each of the second relay nodes having the signal quality exceeding the second forward threshold.

13. The source node of claim 10: wherein the layer circuit defines the first layer of first relay nodes by receiving a relay node identity from each of the first relay nodes having the signal quality exceeding the first reverse threshold; and wherein the layer circuit defines the second layer of second relay nodes by receiving a relay node identity from each of the second relay nodes having the signal quality exceeding the second reverse threshold.

14. The source node of claim 13 wherein the layer circuit is further configured to refine at least one of the first and second layers to adjust at least one of a number of the first relay nodes and a number of the second relay nodes by adjusting at least one of the first forward threshold, the second forward threshold, the first reverse threshold, and the second reverse threshold.

15. The source node of claim 10 further comprising a threshold circuit configured to adjust at least one of the first forward threshold and the second forward threshold to adjust at least one of a number of the first relay nodes and a number of the second relay nodes.

16. The source node of claim 10 further comprising a rate circuit configured to compute at least one of a transmission rate and a quantization rate based on the first relay nodes and the second relay nodes.

17. The source node of claim 10 further comprising a threshold circuit configured to determine the first and second forward thresholds.

18. A method of relaying traffic data in wireless relay node comprised in one of a plurality of layers of relay nodes, the method comprising defining the wireless relay node as part of one of the plurality of layers by: defining the wireless relay node as part of a first layer if the wireless relay node receives a test signal from a source node having a signal quality exceeding a first threshold; defining the wireless relay node as part of a subsequent layer if the wireless relay node receives a test signal from at least one relay node in a previous adjacent layer having a signal quality exceeding a second threshold; when the wireless relay node is defined as part of the first layer, relaying traffic data received from the source node to each relay node in a subsequent adjacent layer; when the wireless relay node is defined as part of a final layer before a destination node, relaying traffic data received from at least one relay node in a penultimate layer, adjacent to the final layer, to the destination node; and when the wireless relay node is defined as part of any subsequent layer except the first layer and the final layer, relaying traffic data received from at least one relay node in a previous adjacent layer to each relay node in a subsequent adjacent layer.

19. The method of claim 18, further comprising: decoding received traffic data having a measured signal quality exceeding a test signal quality before relaying the traffic data to each relay node in the subsequent adjacent layer or to the destination node; and compressing the traffic data when the measured signal quality does not exceed the test signal quality before relaying the traffic data to each relay node in the subsequent adjacent layer or to the destination node.

20. A wireless relay node comprised in one of a plurality of layers of relay nodes, the wireless relay node comprising: a layer circuit configured to define the wireless relay node as part of one of the plurality of layers by: defining the wireless relay node as part of a first layer if the wireless relay node receives a test signal from a source node having a signal quality exceeding a first threshold; and defining the wireless relay node as part of a subsequent layer if the wireless relay node receives a test signal from at least one relay node in a previous adjacent layer having a signal quality exceeding a second threshold; and a transceiver coupled to one or more antennas, the transceiver configured to: when the wireless relay node is defined as part of the first layer, relay traffic data received from the source node to each relay node in a subsequent adjacent layer via the one or more antennas; when the wireless relay node is defined as part of a final layer before a destination node, relay traffic data received from at least one relay node in a penultimate layer, adjacent to the final layer, to the destination node via the one or more antennas; and when the wireless relay node is defined as part of any subsequent layer except the first layer and the final layer, relay traffic data received from at least one relay node in a previous adjacent layer to each relay node in a subsequent adjacent layer via the one or more antennas.

21. The wireless relay node of claim 20, further comprising: a decoding circuit configured to decode received traffic data having a measured signal quality exceeding a test signal quality before relaying the traffic data to each relay node in the subsequent adjacent layer or to the destination node; and a compression circuit configured to compress the traffic data when the measured signal quality does not exceed the test signal quality before relaying the traffic data to each relay node in the subsequent adjacent layer or to the destination node.

* * * * *